US008887296B2

(12) United States Patent
Chen et al.

(10) Patent No.: US 8,887,296 B2
(45) Date of Patent: Nov. 11, 2014

(54) METHOD AND SYSTEM FOR OBJECT-BASED MULTI-LEVEL SECURITY IN A SERVICE ORIENTED ARCHITECTURE

(75) Inventors: Alice Chen, Redmond, WA (US); Alimuddin Mohammad, Redmond, WA (US); Guijun Wang, Issaquah, WA (US); Nicholas Multari, Snoqualmie, WA (US); Changzhou Wang, Bellevue, WA (US); Haiqin Wang, Sammamish, WA (US); Rodolfo A Santiago, Bellevue, WA (US); Shiang-Yu Lee, Lake Forest Park, WA (US); Steve Uczekaj, Bellevue, WA (US); Casey Fung, Kent, WA (US); Victor Lukasik, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 780 days.

(21) Appl. No.: 11/609,752

(22) Filed: Dec. 12, 2006

(65) Prior Publication Data

US 2008/0141333 A1   Jun. 12, 2008

(51) Int. Cl.
| | |
|---|---|
| G06F 17/00 | (2006.01) |
| H04L 29/06 | (2006.01) |
| H04L 12/927 | (2013.01) |
| H04L 12/801 | (2013.01) |
| H04L 12/911 | (2013.01) |
| G06F 21/62 | (2013.01) |
| H04L 12/54 | (2013.01) |

(52) U.S. Cl.
CPC ............ *H04L 63/105* (2013.01); *H04L 47/808* (2013.01); *H04L 47/15* (2013.01); *H04L 47/781* (2013.01); *G06F 21/6218* (2013.01); *H04L 47/805* (2013.01); *H04L 12/5695* (2013.01)
USPC ................... 726/27; 726/26; 726/28; 726/29; 726/30; 713/166; 713/167

(58) Field of Classification Search
USPC ........................... 713/166, 167; 726/2, 26–30
See application file for complete search history.

(56) References Cited

U.S. PATENT DOCUMENTS

| | | | | |
|---|---|---|---|---|
| 7,549,165 B2 * | 6/2009 | Focke et al. | ...................... | 726/22 |
| 7,591,003 B2 * | 9/2009 | Focke et al. | ........................ | 726/1 |

(Continued)

OTHER PUBLICATIONS

Szigeti, Tim et al. "End-to-End QoS Network Design" © 2004 Cisco Press. Excerpts from Chapters 15 & 16 (150 pages).*

(Continued)

*Primary Examiner* — Joseph P. Hirl
*Assistant Examiner* — Thomas Gyorfi
(74) *Attorney, Agent, or Firm* — Armstrong Teasdale LLP

(57) ABSTRACT

A method for administering object-based multi-level security in a service oriented architecture includes: (a) defining a plurality of multi-level security attributes for each of selected respective life-cycle states of a plurality of life-cycle states of a service object; (b) receiving a request from a requestor for the service object; (c) determining permitted actions for the service object based upon at least one selected multi-level security attribute of the plurality of multi-level security attributes, and based upon at least one life-cycle state of the plurality of life-cycle states of the service object; and (d) generating a quality of service security contract based upon the determination of permitted actions.

16 Claims, 1 Drawing Sheet

(56) References Cited

U.S. PATENT DOCUMENTS

| | | | |
|---|---|---|---|
| 7,631,342 B2 * | 12/2009 | Focke et al. | 726/1 |
| 7,676,673 B2 * | 3/2010 | Weller et al. | 713/164 |
| 7,715,565 B2 * | 5/2010 | Kimmel et al. | 380/281 |
| 2003/0005331 A1 * | 1/2003 | Williams | 713/201 |
| 2007/0056036 A1 * | 3/2007 | Focke et al. | 726/22 |
| 2007/0056037 A1 * | 3/2007 | Focke et al. | 726/22 |
| 2007/0118900 A1 * | 5/2007 | Focke et al. | 726/22 |
| 2007/0118901 A1 * | 5/2007 | Focke et al. | 726/22 |
| 2007/0118902 A1 * | 5/2007 | Focke et al. | 726/22 |
| 2007/0130458 A1 * | 6/2007 | Focke et al. | 713/164 |
| 2007/0255942 A1 * | 11/2007 | Weller et al. | 713/151 |

OTHER PUBLICATIONS

Raney, Christopher J.; "Integrating Multilevel Command and Control into a Service Oriented Architecture to provide Cross Domain Capability"; Conference Paper—CCRTS—Space and Naval Warfare Systems Center San Diego CA; Jun. 2006; retrieved from Internet; URL: http;//stinet.dtic.mil/oai/oai? verb=getRecord &metadataPrefix=html&identifier=ADA463317.

Poylisher, Alex et al.; "QoS Mechanisms for Opaque Manets"; Military Communications Conference (MILCOM) 2006; Oct. 23, 2006.

European Patent Office (EPO) Extended Search Report P96282EPOO; Sep. 6, 2008.

* cited by examiner

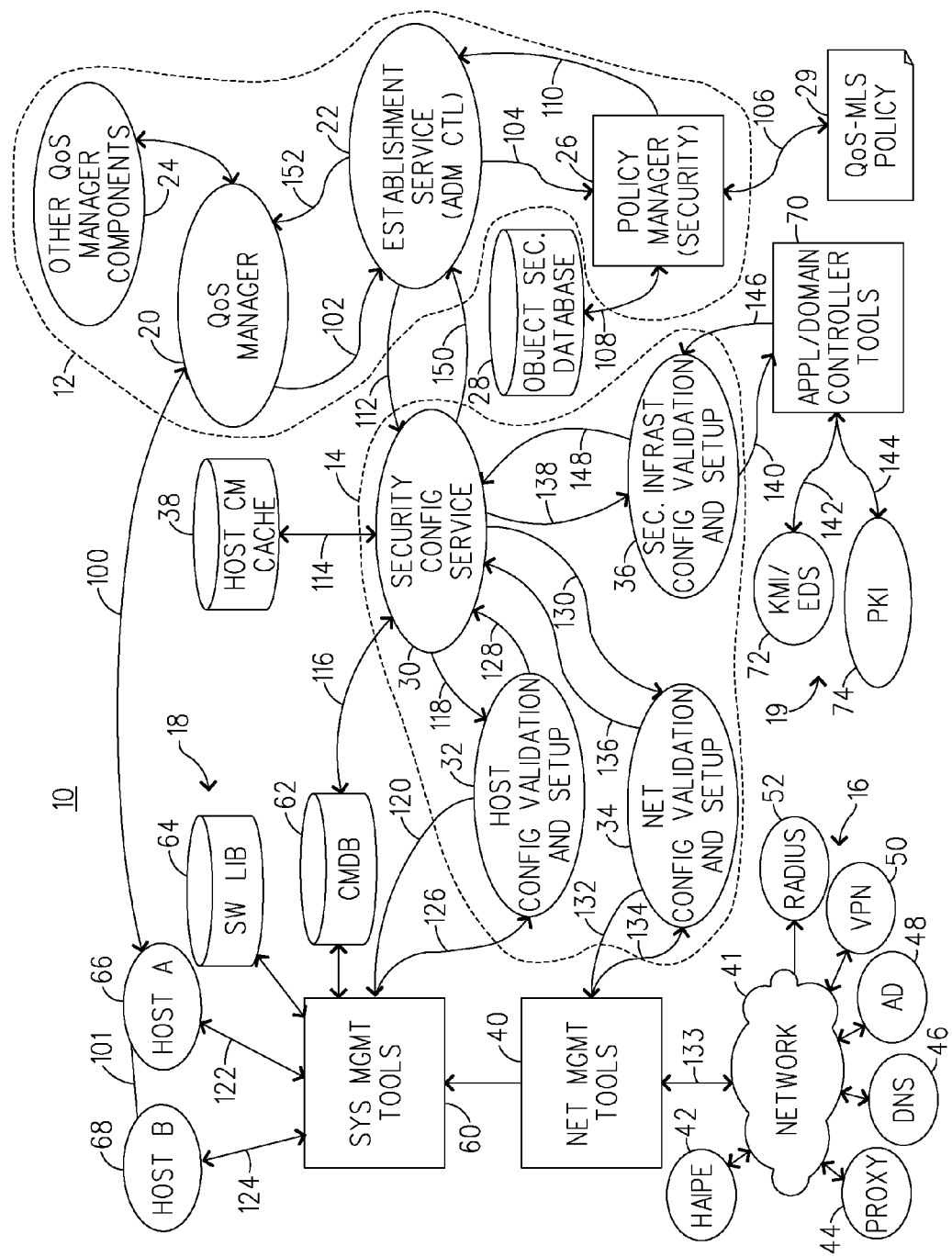

METHOD AND SYSTEM FOR OBJECT-BASED MULTI-LEVEL SECURITY IN A SERVICE ORIENTED ARCHITECTURE

BACKGROUND

The present invention is directed to administering and managing a multi-level security program and system, and especially to administering and managing a multi-level security program and system using a quality of service architecture and system.

The concept of Multi-Level Security (MLS) has been known since around the 1980s time frame. However, in the past MLS has been implemented by using multiple isolated network infrastructures. The various network infrastructures substantially were aligned with operating spheres of various agencies or systems operated by various agencies, such as different government agencies.

After the terrorist attacks of Sep. 11, 2001, information from various government agencies has been required to be shared on a "need to know" basis in order to coordinate anti-terrorist and other operations. In order to achieve such sharing of information the existing MLS network structures need to be transformed into a single MLS infrastructure. By way of example and not by way of limitation, the Department of Defense (DoD) has identified a goal to integrate the JWICS (Joint Worldwide Intelligence Communications System) and SIPRNet (Secret Internet Protocol Router Network) secure networks in the year 2012, and to provide a MLS-enabled integrated infrastructure by the year 2016. Such a transformation of multiple MLS systems into a single integrated MLS infrastructure may take a significant amount of time to develop. Because of the technical difficulties, the transformation to a single MLS infrastructure may take too long to evolve.

MLS may be integrated into a QoS Management architecture at the middleware layer which achieves MLS-QoS integration. Such MLS-QoS integration provides QoS control mechanisms to ensure the separation of object operations at required security levels. This MLS-QoS mechanism enables multi-level secured objects to be hosted on the same computer and to be routed through the same physical network infrastructure while keeping MLS security integrity.

In an enterprise environment, a service may be regarded as a well-defined business function that can be consumed by users inside or outside of the enterprise network boundary. In a distributed computing environment, services may be enabled by one or more distributed computing and network infrastructures. Because enterprises have similar business functions such as Sales/Marketing, Payroll, Finance/Banking and other business functions, there are commonalities among enterprises for services requirements such as data communications, web presentation, security, transaction management, data base access and other requirements in the computing and network infrastructures of various businesses. To meet needs for efficient business processes including, by way of example and not by way of limitation, communications with business partners/suppliers/customers, reduction of operating and supporting costs and fast and flexible applications development, a service oriented architecture (SOA) evolved. The SOA architectural style may enable software application developers to build applications using or re-using services that are implemented in-house, available from an enterprise's computing and network infrastructure or available from the Internet.

The SOA concept is known. However, only since web services became popular and standards (e.g., WSDL (Web Service Definition Language), SOAP (Simple Object Access Protocol) and UDDI (Universal Description, Discovery and Integration)) became established have SOA implementations become feasible. SOA applications use standard defined service interfaces to provide collaborated services on an as-needed basis. As more applications evolve to become SOA based, SOA may also encompass frameworks and business policies to ensure that services are provided and consumed based on an enterprise's business interests.

The more the number of deployed SOA based applications increases, the more the SOA-based services compete for the shared computing and network resources in the infrastructure.

A Quality of Service (QoS) function is an important aspect in SOA. QoS provides optimized resource management and permits a higher priority application/user more computing and networking resources than a lower priority application/user. QoS can also be programmed to provide guaranteed service to a user. Without some policy for establishing priorities, a QoS program or system essentially provides no QoS functionality because in such a no-priority environment all applications/users may think they deserve the best quality of services without regard to other applications/users. QoS is therefore preferably policy-based during the execution of resource allocation, management and adaptation. It is preferable that QoS be effected from end-to-end vertically within each computing device that hosts an application or provides a service. It is also preferred that QoS be effected horizontally within substantially every node across a network infrastructure.

There is a need for an integrated MLS-enabled system and method that can be implemented without significant time required for its development.

SUMMARY

A method for administering object-based multi-level security in a service oriented architecture includes: (a) defining a plurality of multi-level security attributes for each of the selected respective life-cycle states of a plurality of life-cycle states of a service object (the term "service object" is intended in this description to also include data objects or other objects that may exhibit traits of a life-cycle state); (b) receiving a request from a requester for the service object (the receiving may be effected, by way of example and not by way of limitation, by a Quality of Service (QOS) manager); (c) determining permitted actions for the service object based upon at least one selected multi-level security attribute of the plurality of multi-level security attributes, and based upon at least one life-cycle state of the plurality of life-cycle states of the service object (the determining may be effected, by way of example and not by way of limitation, by a security policy manager that specifies the multi-level security attributes for the security resources requirements of each life-cycle state of the data/service object.); and (d) generating a quality of service security contract based upon the determination of permitted actions. The use of the term "contract" in this description is not intended to be limiting, but rather is merely intended to indicate an agreed circumstance under which predetermined security parameters are satisfied. The terms "agreement" or "policy" may as well be employed. The term "contract" is convenient in one sense because it is a term employed by telephone companies in Service Level Agreements (SLA). Preferably, before generating a QoS security contract, a QoS Manager facilitates MLS requirements specified for the hosts, network and security key infrastructure involved according to values specified in the MLS attributes of the data or service object. If the facilitations are successful, then the QoS Manager generates a QoS Security contract, otherwise, no QOS Security contract is generated.

A system for object-based multi-level security in a service oriented architecture includes: (a) at least one object life-cycle data base for storing a plurality of multi-level security attributes for at least one life-cycle state of a service object; (b) a policy manager in communication with the at least one data base; the policy manager determining permitted actions for a service request received from a requestor (preferably the policy manager determines the security resources requirements for the hosts, networks and key infrastructures that are involved for each life-cycle state of the data object or service object and the permitted actions once all infrastructure elements are in place); the service request being based at least in part upon the plurality of multi-level security attributes, upon a security level of the requester and upon a current life-cycle state of the at least one life-cycle state of the service object; and (c) an establishment manager in communication with the policy manager; the policy manager validating and authorizing the service request and generating a quality of service security contract according to the plurality of multi-level security attributes. Preferably, once the permitted action on the data object or service object requested is validated and authorized, the establishment service of the QoS manager generates a QoS security contract only if the QoS Manager can successfully facilitate the MLS requirements specified in the plurality of the multi-level security attributes for each state of each data object or service object for the hosts, network and security key infrastructure elements involved It is, therefore, a feature of the present invention to provide an integrated MLS-enabled system and method that can be implemented without significant time required for its development.

Further features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWING

FIG. 1 is a schematic diagram illustrating the architecture and operation of the preferred embodiment of the present invention.

DETAILED DESCRIPTION

There may be a correlation between a Quality of Service (QoS) discipline and requirements for a multi-level security (MLS) management system. Service-Oriented-Architectures (SOA) are dynamic, flexible and compositional in nature. Challenges for making SOAs effective in a multi-domain environment such as a MLS environment are similar to challenges addressed by Quality of Service (QoS) management. Embodiments of the invention have a SOA based QoS framework architecture and implemented a method and system employing the QoS architecture adapted to include QoS Security characteristics that incorporate the concept of multi-level security (MLS), referred to hereinafter as a QoS-MLS architecture.

The QoS-MLS architecture of an embodiment of the present invention preferably provides a facility at the OSI (Open Systems Interconnection) upper layers to enable on-demand configuration, re-configuration and management of security resources in infrastructures based on multi-level security (MLS) requirements. The QoS-MLS architecture may assume that security resources such as security software for authentication, authorization, encryption, virtual private network, and other security processes are available somewhere on the hosts or networks. The QoS-MLS architecture may rely on system management tools such as, by way of example and not by way of limitation, configuration management and software library downloads to ensure that elements of an infrastructure such as, by way of example and not by way of limitation, computing hosts and workstations are appropriate for the desired security level to meet multi-level security requirements established for the infrastructure, including multi-level security attributes of the requested target data object or service object. The QOS-MLS architecture also may rely on multi-level security policies and security attributes or security metadata rules associated with target objects to enforce multi-level security execution.

One skilled in the art of QoS systems may recognize that the QoS-MLS architecture of an embodiment of the present invention may accommodate plug-ins of any existing MLS solution such as the MLS SNS (Secure Network Server) or later-emerging MLS technologies at the network layer, in an overlay network or in an infrastructure element during configuration of a network.

FIG. 1 is a schematic diagram illustrating the architecture and operation of the preferred embodiment of the present invention. In FIG. 1, a Multi-Level Security (MLS) system 10 includes a Quality of Service (QoS) section 12 implementing a QoS program, a security configuration section 14, a network section 16, a system management section 18 and a security infrastructure section 19. MLS system 10 may also include other system components.

QoS section 12 includes a QoS manager unit 20, coupled with an establishment service unit 22 operating as admission control, and coupled with other QoS manager components, represented by a unit 24. QoS Section 12 may also include a policy manager unit 26 coupled with establishment service unit 22. Policy manager unit 26 may be embodied in an external system that communicates with supporting data stores, such as an object security data store 28 and a QoS-MLS policy data store 29.

Security configuration section 14 includes a security configuration service unit 30 coupled with establishment service unit 22. Security configuration section 14 also includes a host configuration validation and setup unit 32, a network configuration validation and setup unit 34 and a security infrastructure configuration validation and setup unit 36. Validation and setup units 32, 34, 36 may be coupled with security configuration service unit 30. A host configuration management (CM) store or cache 38 may be coupled with security configuration service unit 30.

Network section 16 may include a network management tools unit 40 coupled with a network 41. Network 41 may be configured as a plurality of interconnected networks (not shown in FIG. 1) as may be understood by one skilled in the art of communication systems. Network 41 may be coupled with various entities. By way of example and not by way of limitation, entities coupled with network 41 may include servers or such devices as HAIPE (High Assurance Internet Protocol Encryptor; a secure government virtual private network) 42, a proxy 44 for another system or networked environment, a Domain Name Server (DNS) 46, an Active Directory (AD) 48, a virtual private network (VPN) 50 and RADIUS (Remote Dial In User Service; used for accessing wireless and remote networks) 52. DNS, VPN and RADIUS specifications are defined by the Internet Engineering Task Force (IETF) standard body.

System management section 18 includes a system management tools unit 60 coupled with a configuration management data store or data base 62 and coupled with a software data store or library 64. System management tools unit 60 may also be coupled with a requester entity, station, platform or application HOST A 66 and a target entity, station, platform or application HOST B 68. Configuration management data store 62 may also be connected for access by security configuration service unit 30. System management tools unit 60 may also be coupled with network management tools unit 40. It should be understood that the terms "coupled" and "connected", along with their derivatives are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, or that the two or more elements co-operate or interact with each other (e.g. as in a cause an effect relationship). By way of further illustration, the term "coupled" is not intended to mean that the coupled entities are required to be on the same host or platform; the coupled entities can be connected via a network infrastructure. By way of still further illustration, the term "connected" is not intended to mean that connected entities are required to be on the same host or platform; the connected entities can be connected via a network infrastructure.

Security infrastructure section 19 includes an application/domain controller tools unit 70. Application/domain controller tools unit 70 may be coupled with a Key Management Infrastructure (KMI) unit 72 and with a Public Key Infrastructure (PKI) unit 74.

When a requester entity, platform or application HOST A 66 wishes to access a targeted object such as a targeted entity, platform or application HOST B 68 (indicated by a line 101 representing a pending or desired action that must first be approved), requester HOST A 66 must first initiate a request for a service (or data) object HOST B 68 and this request may be redirected to QoS management unit 20 that will control access permission of HOST A 66 to HOST B 68, as indicated by a query line 100. QoS management unit 20 may respond to the request for a service (or data) object by initiating a QoS message to establishment service unit 22, as indicated by a communication line 102. The QoS message to establishment service unit 22 includes a security label of requester HOST A 66 and profile relating to the service (or data) object request submitted by requester HOST A 66. The profile information may, by way of example and not by way of limitation, include but not be limited to the application/operation type and identification, the source address (e.g., session/port/socket identification of the requesting host), the target object identification, the requested operation, the destination object requested address (e.g., a URL/URI), the QoS parameters such as priority, guaranteed delivery, the content type or similar parameters.

For purposes of this description, query lines support two-way transmissons and communication lines support one-way transmissions. The particular configuration of a respective transmission line (i.e., a query line or a communication line) is not considered limiting with respect to the present invention. Any respective one two-way query line in FIG. 1 may be interchanged with two one-way communication lines without departing from the intended scope of the present invention.

Establishment service unit 22 presents the requester security profile or label received from QoS management unit 20 plus a user profile relating to HOST A 66 to policy manager unit 26, as indicated by a communication line 104. Policy manager unit 26 may query object security data store 28 (indicated by a query line 108) to obtain at least two pieces of information: the target service object MLS level and the list of permitted actions at each MLS level of the requester HOST A 66. Policy manager unit 26 may also query object security data store 28 (indicated by a query line 108) to ascertain whether security parameters stored in object security data store 28 permit actions requested by requester HOST A 66 in the original data or service object request (query line 100) for accessing the targeted service object.

When the target object MLS level is known and if the requested operation in the user profile is permitted according to the permitted actions list or filter, policy manager unit 26 may then generate a signed certificate and also query (query line 106) QOS-MLS policy data store 29 to obtain the MLS security resource requirements by providing the information on the MLS level of the requested object. The MLS security resource requirements may include at least 4 pieces of information: the MLS security resource requirements for the configuration and setup of (1) hosts, (2) network and (3) security infrastructure that are involved during the communications between HOST A 66 and HOST B 68; and (4) guidance relating to how the involved host and network should handle the targeted object at each state of the targeted service object life-cycle. By way of example and not by way of limitation, the MLS security requirements may include: For MLS secret level, digital signature is required, 3DES encryption algorithm and software shall be used before transmission, transmission over a VPN (IPSec protocol) network is a minimum, a secured partition at the host is required when storing the object (i.e., object is in storage state), the object is "downgrade-able" to a MLS unclassified level if and only if the object is passing through a DoD certified cross-domain-guard device/product, the object is not cache-able at the object's transit state at routers and network edge devices, the filtering for certain protocols/ports when passing through network proxy or firewall shall be enabled, the security key used should be registered at which key management infrastructure authority.

Policy manager unit 26 may provide results of its queries of QOS-MLS policy data store 29 (query line 106), its queries of object security data store 28 (query line 108) and the signed certificate to establishment service unit 22, as indicated by a communication line 110.

If policy manager unit 26 queries indicate that HOST A 66 may be permitted for effecting access with object HOST B 68, establishment service unit 22 passes MLS security resource requirements and other information to security configuration service unit 30 in security configuration section 14, as indicated by a communication line 112. Security configuration service unit 30 passes (as indicated by lines 118, 130, 138) the corresponding (host, network and security infrastructures) security resources requirements information received from the establishment service 22 to host configuration validation and setup unit 32, network configuration validation and setup unit 34, and security infrastructure validation and setup unit 36. Security configuration service unit 30 then performs several substantially concurrent checks to insure that communication by request from requestor HOST A 66 with object HOST B 68 is appropriately secured and permitted. Security configuration service unit 30 accesses host configuration management cache store 38 (as indicated by a query line 114) to fetch the current configuration and setup information of HOST B 68 where the requested object resides and of HOST A 66 where the requestor's application resides. If either of the queried info is not available in cache store 38, then Security Configuration service unit 30 queries (as indicated by query line 116) configuration management data store 62 for HOST A 66 or HOST B 68 (or both HOST A 66 and HOST B 68) system configuration and set up information. Security configuration service unit 30 may present results of queries to data stores 38, 62 to host configuration validation and setup unit 32, as indicated by a communication line 118. Host configuration validation and setup unit 32 compares the host MLS security resource requirements for HOST A 66 and HOST B 68 with the current configurations and set up information for HOST A 66 and HOST B 68. If the configuration and set up information for HOST A and HOST B both meet the host MLS security resource requirements, host configuration validation and setup unit 32 notifies (as indicated by line 128) security configuration service unit 30 that HOST A 66 and HOST B 68 are ready. Otherwise, host configuration validation and setup unit 32 may communicate with system management tools unit 60 (indicated by a communication line 120) to convey parameters for use by system management tools unit 60 to download software from software library 64 if necessary, and setup communications between requestor HOST A 66 and object HOST B 68 (indicated by query lines 122, 124) so that HOST A 66 and HOST B 68 system configurations conform to the host MLS security resource requirements. Once Host A 66 and HOST B 68 hardware and software set up and configurations are completed according to host MLS security resources requirements, system management tools unit 60 may confirm the readiness of HOST A 66 and HOST B 68 to host configuration validation and setup unit 32 via a communication line 126, and host configuration validation and setup unit 32 confirms to security configuration service unit 30 that HOST A 66 and HOST B 68 are ready via a communication line 128.

Substantially concurrently with presenting results of queries to data stores 38, 62 to host configuration validation and setup unit 32 (communication line 118), security configuration service unit 30 may communicate with network configuration validation and setup unit 34 (as indicated by a communication line 130) indicating information relating to the MLS security resource requirements of the network infrastructure. Network configuration validation and setup unit 34 communicates with network management tools unit 40 (as indicated by a communication line 132) to ascertain by network management tools unit 40 (via a query line 133) conditions and parameters extant in network 41 and any associated entity 42, 44, 46, 48, 50, 52 (or other entity; not shown in FIG. 1) that will configure or setup according to the MLS security requirements for the network. Network management tools unit 40 also communicates with system management tools unit 60 to query and set up the routing and host tables at the required security level partition for HOST A 66 and HOST B 68. Extant network conditions and parameters may be provided by network management tools unit 40 to network configuration validation and setup unit 34 (as indicated by a communication line 134). If the network infrastructure is configured and set up to meet the MLS security requirements for the network, network configuration validation and setup unit 34 may send a "network ready" notification to security configuration service unit 30 (as indicated by a communication line 136).

Also substantially concurrently with presenting results of queries to data stores 38, 62 to host configuration validation and setup unit 32 (communication line 118), security configuration service unit 30 may communicate with security infrastructure configuration validation and setup unit 36, as indicated by a communication line 138. Security configuration service unit 30 passes the MLS security resource requirements to security infrastructure configuration validation and setup unit 36.

Security infrastructure configuration validation and setup unit 36 may communicate with application/domain controller tools unit 70 (as indicated by a communication line 140) to initiate a security key check by application/domain controller tools unit 70. Application/domain controller tools unit 70 ensures the public keys of the requester and the target object application domain access key are registered and updated in key management infrastructure (PKI) unit 74 or in key management infrastructure (KMI)/enterprise directory system (EDS) unit 72 under the same authority specified in the MLS security resource requirements. Application/domain controller tools unit 70 also ascertains whether there is an appropriate presence of security keys indicated by (PKI) unit 74 or in KMI/EDS unit 72 (via query lines 142, 144). Security keys may be used by requester HOST A 66 when accessing object HOST B 68. Once PKI unit 74 and KMI/EDS unit 72 validate the related keys registration and distribution, application/domain controller tools unit 70 sends a "security infrastructure ready" notification to security infrastructure configuration, Validation and Setup unit 36. Security infrastructure configuration, validation and setup unit 36 forwards the notification to security configuration service unit 30.

After security configuration service unit 30 receives "ready" notifications from (1) Host Configuration Validation and Setup unit 32 (communication line 128), (2) Network Configuration Validation and Setup unit 34 (communication line 136) and (3) Security Infrastructure Validation and Setup unit 36 (communication line 148), security configuration service unit 30 provides a "ready" notification to establishment service unit 22, as indicated by a communication line 150. Once establishment service unit 22 receives a "ready" notification from security configuration service unit 30, establishment service unit 22 generates a QoS-MLS contract and sends the contract to QoS manager unit 20, as indicated by a communication line 152. The contract includes appropriate information such as, by way of example and not by way of limitation, an operation QoS service level agreement and the signed certificate that was received earlier from establishment service unit 22. The information enables access to object HOST B 68 by requester HOST A 66. The contract may be provided to requester HOST A 66 by QoS manager unit 20 via a response on query line 100. The contract provides access codes, signed certificate or other information necessary for requester HOST A 66 to access object HOST B 68. If, after a configurable period of time, establishment service unit 22 does not receive a ready notification from security configuration service unit 30, establishment service unit 22 generates an event to notify QoS manager unit 20 that the MLS security contract can not be established. QoS Manager unit 20 forwards the notification to requestor HOST A 66 indicating access is denied because MLS requirements have not been met.

If requester HOST A 66 receives the QOS-MLS contract, requestor HOST A 66 may accept the contract and notify QoS manager unit 20 to proceed with the contract via the network infrastructure that was validated or set-up per the MLS requirements by the Security Configuration Service unit 30. QoS manager unit 20 may then redirect the original request from requestor HOST A 66 via the network infrastructure to HOST B 68 and start to monitor and manage the contract while the requested operation is carried out by the host, network and security infrastructures that were setup prior to the contract establishment.

Information passed among the various entities of MLS system 10, including information conveyed in the contract, may be partly or wholly embodied in metatags or similar embedded data, may be embodied in e-mail format, or may be embodied in another format or entity capable of conveying the desired information. Further, some or all information passed among the various entities of MLS system 10 may be encrypted or otherwise encoded to frustrate access and understanding by parties outside MLS system 10. Existing technologies such as secured federation protocol, single sign-on or VPN (Virtual Private Network) tunnel may be employed to establish authenticated and authorized communications between any two communicating entities of MLS system 10.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A method for administering object-based multi-level security in a service oriented architecture; the method comprising:
    defining a plurality of multi-level attributes for each of selected life-cycle states of a plurality of life-cycle states of a service object, wherein the plurality of multi-level attributes include a first program attribute related to a security clearance level, a second program attribute related to an operating parameter, and a third program attribute related to a security key;
    receiving a request from a requestor for said service object;
    determining permitted actions for said service object based upon said plurality of multi-level attributes, and based upon at least one life-cycle state of said plurality of life-cycle states of said service object, wherein security aspects of a host machine are reconfigured when the permitted actions do not comply with the received request such that the permitted actions comply with the received request;
    authenticating the received request based upon said determining of permitted actions; and
    generating a quality of service security contract having associated access identifiers enabling the requestor to effect access to the service object.

2. A method for administering object-based multi-level security in a service oriented architecture as recited in claim 1 wherein the first program attribute is related to a plurality of security clearance levels.

3. A method for administering object-based multi-level security in a service oriented architecture as recited in claim 2 wherein access by said requestor to said service object may be effected by at least one communication link, said at least one communication link including a plurality of infrastructure units; said infrastructure units being of various infrastructure types, and wherein the second program attribute is related to security resource requirements for each respective infrastructure type of said plurality of infrastructure types.

4. A method for administering object-based multi-level security in a service oriented architecture as recited in claim 3 wherein said operating parameter includes at least one of bit-level of encryption, speed of data transmission, level of firewall protection and level of password protection for entry and use of a respective said infrastructure type.

5. A method for administering object-based multi-level security in a service oriented architecture as recited in claim 2 wherein said operating parameter includes at least one of bit-level of encryption, speed of data transmission, level of firewall protection and level of password protection for entry and use of a respective said infrastructure type.

6. A method for administering object-based multi-level security in a service oriented architecture as recited in claim 1 wherein access by said requestor to said service object may be effected by at least one communication link, said at least one communication link including a plurality of infrastructure units, said infrastructure units being of various infrastructure types; and where said plurality of multi-level security attributes includes security resource requirements for each respective infrastructure type of said plurality of infrastructure types.

7. A method for administering object-based multi-level security in a service oriented architecture as recited in claim 6 wherein said operating parameter includes at least one of bit-level of encryption, speed of data transmission, level of firewall protection and level of password protection for entry and use of a respective said infrastructure type.

8. A method for administering object-based multi-level security in a service oriented architecture as recited in claim 1 wherein said operating parameter includes at least one of bit-level of encryption, speed of data transmission, level of firewall protection and level of password protection for entry and use of a respective said infrastructure type.

9. A method for administering object-based multi-level security in a service oriented architecture as recited in claim 1 wherein the reconfiguring includes downloading software from a software library to a host.

10. A method for administering object-based multi-level security in a service oriented architecture as recited in claim 1 wherein the reconfiguring includes configuring the multi-level security requirements for a network, including setting up routing and host tables.

11. A system for object-based multi-level security in a service oriented architecture; the system comprising:
    at least one object life-cycle data base for storing a plurality of multi-level security attributes for at least one life-cycle state of a service object, wherein the plurality of multi-level attributes include a first program attribute related to a security clearance level, a second program attribute related to an operating parameter, and a third program attribute related to a security key;
    a policy manager in communication with said at least one data base; said policy manager determining permitted actions for a service request received from a requestor; said service request being based at least in part upon said plurality of multi-level security attributes, upon a security level of said requestor and upon a current life-cycle state of said at least one life-cycle state of said service object;
    a security configuration service unit arranged to reconfigure security aspects of a host machine if the permitted actions do not comply with the received service request such that the permitted actions comply with the received request; and
    an establishment manager in communication with said policy manager; said establishment manager validating and authorizing said service request and generating a quality of service contract according to said plurality of multi-level attributes.

12. A system for object-based multi-level security in a service oriented architecture as recited in claim 11 wherein said contract includes associated access identifiers; said associated access identifiers being useful by said requestor for effecting access to said service object.

13. A system for object-based multi-level security in a service oriented architecture as recited in claim 12 wherein the first program attribute is related to a plurality of security clearance levels.

14. A system for object-based multi-level security in a service oriented architecture as recited in claim 13 wherein access by said requestor to said service object may be effected by at least one communication link including a plurality of infrastructure units, said infrastructure units being of various infrastructure types; and wherein the second program attribute is related to security resources requirements for each respective infrastructure type of said plurality of infrastructure types.

15. A system for object-based multi-level security in a service oriented architecture as recited in claim 11 wherein the first program attribute is related to a plurality of security clearance levels.

16. A system for object-based multi-level security in a service oriented architecture as recited in claim 11 wherein access by said requestor to said service may be effected by at least one communication link, said at least one communication link including a plurality of infrastructure units, said infrastructure units being of various infrastructure types; and wherein the second program attribute is related to security resources requirements for each respective infrastructure type of said plurality of infrastructure types.

\* \* \* \* \*